Figure 1:
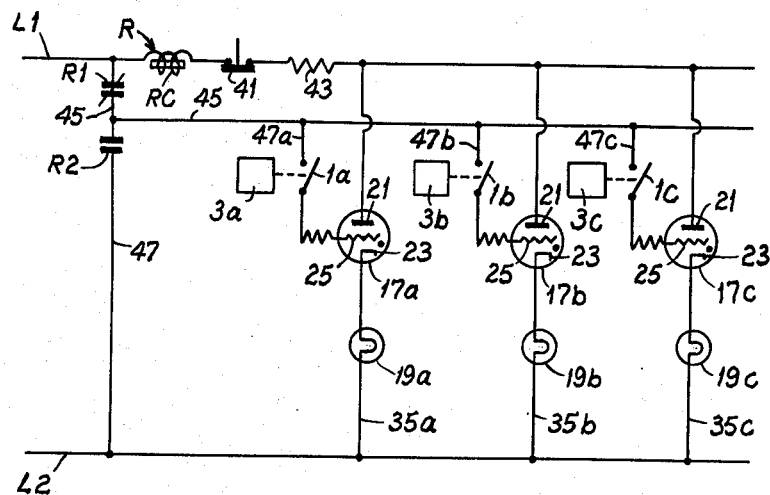

Warren L. Spielman,
Inventor.

Koenig, Pope, Senniger and Powers,
Attorneys.

United States Patent Office 3,147,464
Patented Sept. 1, 1964

3,147,464
FIRST-OUT ANNUNCIATOR HAVING INPUT AND SUPPLY CONTROL OF INDICATOR SWITCHING MEANS
Warren L. Spielman, 7301 Overbrook, Normandy, Mo.
Filed Oct. 16, 1961, Ser. No. 145,057
15 Claims. (Cl. 340—223)

This invention relates to annunciators, and more particularly to a so-called "first-out" system for indicating which one of a plurality of annunciator signals was first received.

This application is a continuation-in-part of my copending application Serial No. 806,900, filed April 16, 1959 and now abandoned.

It will be understood that a typical annunciator comprises a signal board having a plurality of electrical signalling devices, such as lamps, for example, each of which is connected in a circuit for operation in response to an electrical signal from a remote location. Such an annunciator is frequently used for monitoring a plurality of items of equipment, such as various items of equipment in an electrical power generating station or in an industrial plant, for example. For such purpose, each item of equipment to be monitored has a sensing switch associated therewith (such as a temperature-responsive switch or a pressure-responsive switch, for example), the sensing switch being actuated upon failure of or trouble in the item of equipment with the result that an electrical signal is transmitted to the respective signalling device on the annunciator board to indicate failure of or trouble in that particular item of equipment.

It frequently occurs that failure of or trouble in one item of equipment being monitored by such a system will cause failure of or trouble in one or more additional items of equipment. Under such circumstances, it is desirable to provide an indication of which item was the first to fail or develop trouble, in order to simplify the task of restoring the plant to operation, this type of indication being referred to as "first-out" indication.

Accordingly, it is an object of this invention to provide a "first-out" indicating system for an annunciator adapted reliably to provide an indication of which signalling device in an annunciator board of several such devices that may be energized was the first to be energized. A further object of the invention is the provision of a wholly electrically controlled "first-out" system for the purpose described which has such a rapid response to actuation of any one of the sensing switches in the system, with accompanying energization of the signalling device for that switch, as to preclude the energization of any other signalling device even though the sensing switch for another signalling device should happen to close within a very small fraction of a second after closure of the said one sensing switch. A still further object of the invention is the provision of a wholly electrical "first-out" system in which a means for holding a momentary actuation of a sensing switch is provided. A still further object is the provision of a "first-out" system for the purpose described which employs semiconductor devices. Other objects and features will be in part apparent and in part pointed out hereinafter.

The invention accordingly comprises the constructions hereinafter described, the scope of the invention being indicated in the following claims.

Figure 2:
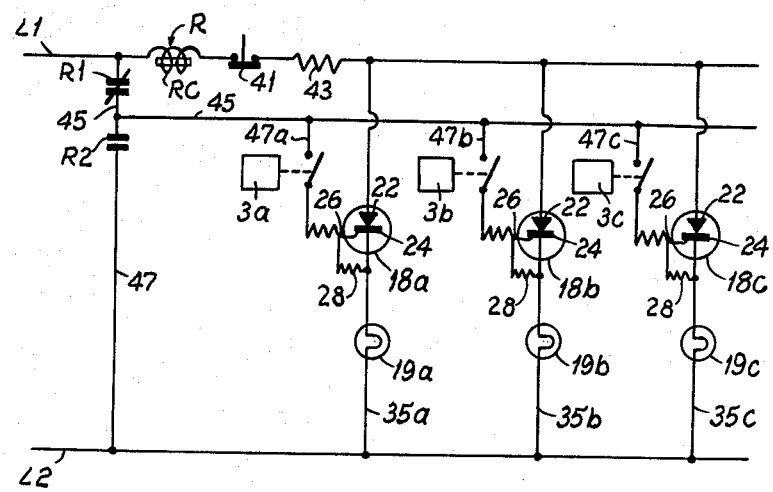

In the accompanying drawings, in which several of various possible embodiments of the invention are illustrated, FIGS. 1–2 are diagrams respectively illustrating two different versions of the "first-out" annunciator system of this invention.

Corresponding reference characters indicate corresponding parts throughout the several views of the drawings.

Referring to FIG. 1, a first version of the "first-out" annunciator system of this invention is shown to comprise a plurality of sensing switches 1a, 1b, 1c (three being shown as typical of any number of switches). Each of these is associated with a different device to be monitored. The monitored device with which switch 1a is associated is designated 3a, the device with which switch 1b is associated is designated 3b, etc. It will be understood that each switch is adapted to be actuated (closed) upon occurrence of an abnormal condition in the respective monitored device. For example, switch 1a might be a thermostatic switch adapted to close in response to overheating of device 3a. Switch 1b might be a pressure-responsive switch adapted to close in response to rise in pressure in device 3b above a predetermined value.

For each switch there is an indicating circuit 35a, 35b, 35c. Each of these includes a glow-discharge triode tube 17a, 17b, 17c (as the control means therefor) and a lamp 19a, 19b, 19c. Each of the tubes 17a, 17b, 17c may be a tube such as a No. 5823 glow-discharge tube manufactured by the Radio Corporation of America, having an anode 21, a cathode 23, and a starter electrode 25. A voltage-reducing means is constituted by a relay R having a coil RC and two sets of contacts R1 and R2. A D.C. power supply circuit is indicated at L1, L2. Coil RC of relay R is connected in line L1 in series with a normally closed reset switch 41 and a resistor 43. As to each indicating circuit, the respective lamp is in series with the anode-cathode circuit of the respective tube, and each indicating circuit is connected in series with coil RC, reset switch 41 and resistor 43. Relay contacts R1, which are normally closed, are connected in a line 45 which is connected to line L1 at a point between the source and coil RC. Relay contacts R2, which are normally open, are connected in a line 47 for grounding line 45 to line L2 when contacts R2 are closed upon energization of coil RC. Sensing switch 1a is connected in a line 47a between line 45 and the starter electrode of tube 17a. Sensing switch 1b is connected in a line 47b between line 45 and the starter electrode of tube 17b. Sensing switch 1c is connected in a line 47c between line 45 and the starter electrode of tube 17c.

The operation of the FIG. 1 system is as follows:

When any one of the sensing switches closes in response to an abnormality of the respective associated monitored device, full source voltage is applied across the starter electrode-cathode circuit of the respective glow-discharge tube to fire it. For example, if switch 1a closes, full source voltage is applied across the starter electrode-cathode circuit of tube 17a to fire it. Once tube 17a has fired, it draws current through coil RC, switch 41 and resistor 43. The latter limits the current to keep it below the rating of the tube. The voltage drop across the resistor 43 in ineffective to disable tube 17a because the tube is adapted to continue in operation at a lower voltage than its firing voltage. Coil RC being energized, contacts R1 open and contacts R2 close. With contacts R1 open, line 45 is deenergized, and with contacts R2 closed, any residual voltage in line 45 is dissipated to ground, meaning that the voltage across the sensing switches is reduced to zero. Accordingly, even if one or more of the remaining sensing switches 1b, 1c should also close, the respective tube 17b, 17c will not fire. It is again to be mentioned that it is characteristic of the glow-discharge tube to fire extremely rapidly, which means that even though switch 1b (for example) should close almost immediately upon the closure of switch 1a, tube 17a fires so fast as to preclude the possibility of tube 17b firing. Accordingly, only lamp 19a is energized to indicate that device 3a monitored by sensing switch 1a was the "first-out" device. To reset the system, reset switch 41 is opened, thereby breaking the circuit to all the glow-discharge tubes to disable any one of them that had been in operation. It will be understood that it is possible that grounding line 47 and contacts R2 may be omitted, if grounding of line 45 is not deemed critical.

FIG. 2 illustrates a second version of the annunciator system of this invention. In this embodiment each indicating circuit 35a, 35b, 35c includes a silicon controlled rectifier designated 18a, 18b, 18c as a control means therefor. A silicon controlled rectifier is a three-junction semiconductor device that normally represents an open circuit, but switches rapidly to the conducting state of a single junction rectifier when an appropriate gate signal is applied to the starter or control electrode or gate terminal. Each of these silicon controlled rectifiers has an anode 22, a cathode 24 and a starter electrode or "gate" 26. A resistor 28 is connected between the cathode 24 and the gate 26 of each of the rectifiers to protect against possible damage which might result from excessive voltages being applied to these cathodes. The remaining elements of FIG. 2 are the same as illustrated in FIG. 1.

The operation of the FIG. 2 system is as follows:

When any one of the sensing switches closes in response to an abnormality of the respective associated monitored device, voltage is applied to the gate 26 of the respective silicon controlled rectifiers to cause conduction. For example, if switch 1a closes, voltage is applied to gate 26 of silicon controlled rectifier 18a causing conduction therethrough and drawing current through coil RC, switch 41 and resistor 43. The latter limits the current to keep it below the rating of the rectifier. The voltage drop across the resistor 43 is ineffective to disable device 18a because this device is adapted to conduct at a voltage lower than its firing voltage. Coil RC being energized, contacts R1 open and contacts R2 close. With contacts R1 open, line 45 is deenergized, and with contacts R2 closed, any residual voltage in line 45 is dissipated to ground, meaning that the voltage across the sensing switches is reduced to zero. Accordingly, even if one or more of the remaining sensing switches 1b, 1c should close, the respective devices 18b, 18c will not conduct. Additionally, the grounding of line 45 eliminates the possibility of subsequent indicating circuits being fired by stray voltages which might be present in the circuit.

To reset the system, reset switch 41 is opened, thereby breaking the circuit to all the devices 18a, 18b, 18c to disable any one of them that had been in operation. It will be understood that it is possible that grounding line 47, and contacts R2 may be omitted, if grounding of line 45 is not deemed critical.

It will be observed that, as regards either of the FIGS. 1 or 2 systems, even a momentary closure of a sensing switch will effect triggering and holding of the respective indicating circuit. Any of tubes 17a, 17b, 17c or rectifiers 18a, 18b, 18c is adapted to become conductive and to remain conductive even upon momentary electrical pulsing of the respective starter electrode 25 or gate 26, and to remain conductive (even though the respective sensing switch opens almost immediately) until switch 41 is opened. A pulse of no more than a few microseconds duration is sufficient to trigger and hold an indicating circuit. In this regard, it is to be noted that an annunciator system of this invention may be used to monitor equipment as to which abnormalities may be electrical in nature and often of extremely short duration.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A first-out monitoring annunciator system comprising a plurality of devices to be monitored, a D.C. supply circuit, a plurality of indicating circuits connected across said supply circuit, each indicating circuit having a glow-discharge tube connected therein, each tube being a triode having a starter electrode, the anode-cathode circuit of each tube being series-connected in the respective indicating circuit, a control circuit connected to said supply circuit, and a plurality of sensing switches, each associated with a respective device to be monitored and adapted to be actuated in response to occurrence of an abnormal condition in the respective monitored device, each sensing switch being connected between said control circuit and the starter electrode of a respective tube, and means responsive to actuation of any one of the sensing switches and resultant response of the respective tube for concurrently reducing the voltage applied to all the other tubes and disconnecting said control circuit from said supply circuit whereby actuation of any other tube is precluded even though the sensing switch therefor should be actuated.

2. A first-out monitoring annunciator system as set forth in claim 1 wherein an electrical signal is connected in series with each glow-discharge tube in each indicating circuit.

3. A first-out monitoring annunciator system comprising a plurality of devices to be monitored; a plurality of indicating circuits connected in parallel, one for each device, each of said indicating circuits including a three element control device having at least one control electrode; a source of voltage connected to each of said indicating circuits, said source having at least two terminals; a control circuit; a plurality of switches, one for each control device, each switch adapted to be closed in response to occurrence of an abnormal condition in the respective monitored device to connect a respective control electrode to said control circuit; means for switchably connecting said control circuit to a first terminal of said source; each control device, in response to the control electrode thereof, being such as to provide a circuit between the two terminals of said source; and means in said last-mentioned circuit for concurrently reducing the voltage applied to said control devices and disconnecting said control circuit from said source.

4. A first-out monitoring annunciator system as set forth in claim 3 wherein said last-named means includes a relay and the means for switchably connecting said control circuit to the first terminal of said source is a normally-closed contact of said relay.

5. A first-out monitoring annunciator system as set forth in claim 3 wherein said control device is a glow-discharge triode and said control electrode is a starter electrode.

6. A first-out monitoring annunciator system as set forth in claim 3 wherein said control device is a semiconductor device and said control electrode is a gate electrode.

7. A first-out monitoring annunciator system as set forth in claim 3 further comprising a normally-closed reset switch between said source and said plurality of indicating circuits.

8. A first-out monitoring annunciator system as set forth in claim 4 wherein said control circuit is switchably connected to the second terminal of said source.

9. A first-out monitoring annunciator system for monitoring a plurality of devices, said system comprising a D.C. source, a plurality of indicating circuits connected across said source, each indicating circuit including an electronic control device having first and second electrodes connected in a respective indicating circuit and a control electrode adapted to control conduction between said first and second electrodes, a control circuit connected to said source, and a plurality of sensing switches, each associated with a respective device to be monitored and adapted to be actuated in response to occurrence of an abnormal condition in the respective monitored device, each sensing switch being connected between said control circuit and the control electrode of a respective electronic control device, and means responsive to actuation of any one of said sensing switches and the resultant response of the respective electronic control device for concurrently reducing the voltage applied to said electronic control devices and disconnecting said control circuit from said source whereby actuation of any other control device is precluded even though the sensing switch therefor should be actuated.

10. A first-out monitoring annunciator system as set forth in claim 9 wherein said electronic control device is a glow-discharge triode and said control electrode is a starter electrode.

11. A first-out monitoring annunciator system as set forth in claim 9 wherein said electronic control device is a silicon controlled rectifier and said control electrode is a gate electrode.

12. A first-out monitoring annunciator system as set forth in claim 9 wherein said means responsive to actuation of any one of said sensing switches includes a relay having a coil connected in series with a resistance between each of said indicating circuits and said source, said relay having a set of contacts connected between said source and said control circuit which open in response to conduction of any of said electronic control devices.

13. A first-out monitoring annunciator system as set forth in claim 12 wherein said relay includes a second set of contacts connected between said control circuit and ground which close in response to conduction of any of said electronic control devices, whereby said control circuit is connected to ground upon actuation of any of said sensing switches.

14. A first-out monitoring annunciator system for monitoring a plurality of devices, said system comprising a D.C. source having a pair of output terminals, a plurality of indicating circuits each including an electronic control device having first and second electrodes connected in series with signal means and a control electrode adapted to control conduction between said first and second electrodes, a relay having normally closed contacts, normally open contacts and a coil, means including the coil of said relay and a voltage drop resistance connecting each of said indicating circuits across said source, a control circuit connected with one terminal of said source by said normally closed contacts and to the other terminal of said source by said normally open contacts, and a plurality of sensing switches each associated with a respective device to be monitored and adapted to be actuated in response to occurrence of an abnormal condition in the respective monitored device, each sensing switch being connected between said control circuit and a control electrode of a respective electronic control device whereby actuation of any one of said sensing switches causes conduction of a respective control device which concurrently lowers the voltage applied to each of said control devices and energizes the coil of said relay thereby to disconnect said control circuit from said one terminal of said source and connect it to the other terminal of said source so that conduction of any other control device is precluded even though the sensing switch therefor should be actuated.

15. A first-out monitoring annunciator system as set forth in claim 14 further comprising a normally closed reset switch connected in series with said coil and said voltage drop resistance between said source and said indicating circuits.

References Cited in the file of this patent

UNITED STATES PATENTS

| 2,434,989 | Christian | Jan. 27, 1948 |
| 2,578,701 | Hecht | Dec. 18, 1951 |
| 2,594,389 | Bruce | Apr. 29, 1952 |
| 2,643,168 | Louthan | June 23, 1953 |

OTHER REFERENCES

Publication: Bell Telephone Laboratories Series, "The Design of Switching Circuits," William Keister et al., September 1951, D. Van Nostrand Co., pages 358–363 relied on.